UNITED STATES PATENT OFFICE.

WILLIS R. WHITNEY, OF SCHENECTADY, NEW YORK, ASSIGNOR TO GENERAL ELECTRIC COMPANY, A CORPORATION OF NEW YORK.

PURIFICATION OF ASBESTOS.

1,094,505. Specification of Letters Patent. Patented Apr. 28, 1914.

No Drawing. Application filed September 1, 1911. Serial No. 647,204.

*To all whom it may concern:*

Be it known that I, WILLIS R. WHITNEY, a citizen of the United States, residing at Schenectady, in the county of Schenectady, State of New York, have invented certain new and useful Improvements in the Purification of Asbestos, of which the following is a specification.

Commercial asbestos is commonly associated with mineral impurities, such as particles of magnetite which are so small and so adherent to the fibers of the asbestos as to make their removal by mechanical means impracticable. The well-known solvents for magnetite, such as some of the strong mineral acids, attack not only the magnetite itself but also the asbestos and, therefore, make chemical purification thereby impossible without damage to the asbestos itself.

I have discovered that magnetite particles may readily be dissolved without damage to the asbestos by a dilute solution of oxalic acid. Apparently the oxalic acid reduces the magnetite to metallic iron or to some other state of oxidation lower than that of magnetite and then dissolves this product to form an iron oxalate.

My invention may be carried out by simply placing the commercial asbestos, either as loose fibers, or fabric such as sheets, or in any other form, in an aqueous solution of oxalic acid containing about two per cent. by weight of the acid. The magnetite will be found to have been completely dissolved in about forty-eight hours. At lower concentrations of the solvent, the action is slower and at higher concentrations, there is a tendency of the asbestos to become brittle. While I therefore do not wish to be limited to this particular concentration of acid, I believe it to be preferable. After this treatment, the solution of oxalate of iron is removed from the fiber by simply washing with water. Before being subjected to this treatment, I found that a $\frac{3}{4}''$ tape made of the best grade of asbestos showed upon a test, in at least fourteen spots per foot a resistance as low as six hundred to seven hundred ohms. After the above described treatment, this tape had a uniform resistance of one and one-half megohms. The usefulness of asbestos as an insulating material is, therefore, greatly extended by the application of my process of purification.

What I claim as new and desire to secure by Letters Patent of the United States, is,—

1. The process of improving the insulating property of commercial asbestos which consists in subjecting the same to the action of a solution of an acid possessing reducing property until conducting particles have been removed therefrom.

2. The process which consists in subjecting commercial asbestos containing magnetite to the action of a solution of oxalic acid.

3. The process which consists in subjecting commercial asbestos fiber containing magnetite to the action of a solution containing a few per cent. of oxalic acid.

4. The process which consists in treating fabric made of commercial asbestos with a solution of oxalic acid, and then washing with water.

5. Asbestos fabric substantially free from magnetite and having a high insulation resistance.

In witness whereof, I have hereunto set my hand this 31st day of August, 1911.

WILLIS R. WHITNEY.

Witnesses:
BENJAMIN B. HULL,
HELEN ORFORD.